(12) United States Patent
Wichmann

(10) Patent No.: US 6,415,160 B1
(45) Date of Patent: Jul. 2, 2002

(54) DEVICE FOR MANAGING DATA IN A MOBILE TELEPHONE

(75) Inventor: Friedrich Wichmann, Paderborn (DE)

(73) Assignee: Orga Kartensysteme GmbH, Paderborn (DE)

(*) Notice: Subject to any disclaimer, the term of this patent is extended or adjusted under 35 U.S.C. 154(b) by 0 days.

(21) Appl. No.: 09/423,692

(22) PCT Filed: Mar. 4, 1999

(86) PCT No.: PCT/DE99/00585

§ 371 Date: Nov. 12, 1999

§ 102(e) Date: Nov. 12, 1999

(87) PCT Pub. No.: WO99/48313

PCT Pub. Date: Sep. 23, 1999

(30) Foreign Application Priority Data

Mar. 13, 1998 (DE) .......................... 198 10 926

(51) Int. Cl.[7] .............................. H04Q 7/32; H04Q 7/20
(52) U.S. Cl. ................. 455/558; 455/418; 455/419; 455/550; 455/466; 455/517
(58) Field of Search ................. 455/558, 418, 455/419, 420, 466, 422, 425, 550, 551, 556, 557, 575, 90, 88, 564, 403, 517

(56) References Cited

U.S. PATENT DOCUMENTS 5,471,518 A * 11/1995 Barber et al. ............... 455/558
6,011,976 A * 1/2000 Michaels et al. .......... 455/558
6,014,561 A * 1/2000 Molne ........................ 455/419

FOREIGN PATENT DOCUMENTS

DE 0562890 A1 * 9/1993

* cited by examiner

Primary Examiner—Lee Nguyen
Assistant Examiner—Keith Ferguson
(74) Attorney, Agent, or Firm—Foley & Lardner

(57) ABSTRACT

An apparatus for the management of data for the operation of a communications network has a message unit for transmitting and receiving short messages to and from a smart card. The apparatus also has a central management unit. The central management unit has a database that stores smart card-specific data and that stores application-specific data relating to applications stored on the smart card. The number of free memory fields available for an application on the smart card can be determined at any time.

4 Claims, 2 Drawing Sheets

DEVICE FOR MANAGING DATA IN A MOBILE TELEPHONE

BACKGROUND

The invention generally relates to an apparatus for the management of data for the operation of a communications network.

European Patent Application No. 689 368 A1 discloses an apparatus for the communication of messages in a communications network for voice and data processing, which relates to a cellular mobile radio network according to the GSM standard (Global System for Mobile Communication). The entire area of the mobile radio network is covered by mutually adjoining and mutually overlapping radio cells. Each radio cell is provided with a base station (PBS, radio base station) which performs the radio supply to the mobile radio terminals. On each radio link between the base station and the terminal, all the voice and control information items are transmitted in a digitally encrypted manner. A base station controller (BSC) provides for a smooth progression when a terminal passes from one radio cell to another neighboring cell. For their part, the base station controllers are combined into a superordinate mobile service switching center (MSC) which establishes the transition to a wire-based network, for example.

Connected to the mobile service switching center is a short message service center (SMS-C) which controls the connection and the transmission of messages (short messages) from a central computer to a terminal or from a first terminal to a second terminal (point-to-point). In GSM phase 2, it was thus possible to communicate short messages such as "Please call subscriber xy" via the short message service center (SMS-C) to a terminal. With GSM phase 2+, it is now provided that applications can be communicated from a central computer via the short message service center (SMS-C) to a terminal and then be stored permanently on a smart card. By way of example, a list of service numbers of the network operator can be stored on a memory area of the smart card to which the subscriber can have recourse at any time, in which case the corresponding application cannot be erased by the subscriber. A further memory field is required for each further application to be implemented on the smart card by the network operator. Since the memory reserve of the smart card is limited, it can happen that a desired application cannot be stored.

SUMMARY OF THE INVENTION

An embodiment of the invention includes an apparatus for the management of data for the operation of a communications network. The communications network has a multiplicity of terminals that are each assigned to a user by means of a smart card that can communicate with the terminal. The apparatus has a message unit for transmitting and receiving short messages to and from the smart card and a central management unit. The central management unit has a database that stores smart card-specific data and that stores application-specific data relating to applications stored on the smart card. The number of free memory fields available for an application on the smart card can be determined at any time for the smart card.

An object of the invention, therefore, is to design an apparatus for the management of data for the operation of a communications network in such a way as to enable memory space management for the respective smart cards of the terminal, so that the network operator and/or the subscriber can obtain information about the present free memory reserve at any time.

An advantage of the invention consists, in particular, in the fact that the apparatus according to the invention enables particularly fast and effective management of data which keeps ready for a user the necessary information about the memory reserve on the smart card, in order to make the decision as to whether and if appropriate which application can be stored on the smart card.

According to one embodiment of the invention, an application database is provided, in which the application-specific data are stored. These data preferably comprise categorized information about the storage size of the applications that are possibly to be transmitted to the smart card, with the result that the database only has to be of a limited size.

According to one aspect of the invention, the message unit is connected to a short message unit, with the result that it is possible to be informed about the free memory reserve on the relevant smart card by the transmission and reception of a standardized short message. Provided that there is sufficient free memory space on the smart card for the relevant application, this application can be transmitted to the smart card by means of the short message and be stored in the smart card. Consequently, after the memory space monitoring has been effected, the user immediately obtains the desired application implemented on his smart card.

According to one aspect of the invention, an SIM database is provided, in which the card-specific data are stored. By virtue of the separate assignments of the card-specific data to the SIM database, on the one hand, and of the application-specific data to the application database, on the other hand, it is possible to achieve rapid retrieval of the extensive information.

BRIEF DESCRIPTION OF THE DRAWINGS

An exemplary embodiment of the invention is described in more detail below with reference to the drawings.

In the figures.

DETAILED DESCRIPTION OF THE PREFERRED EMBODIMENT

Figure 1:
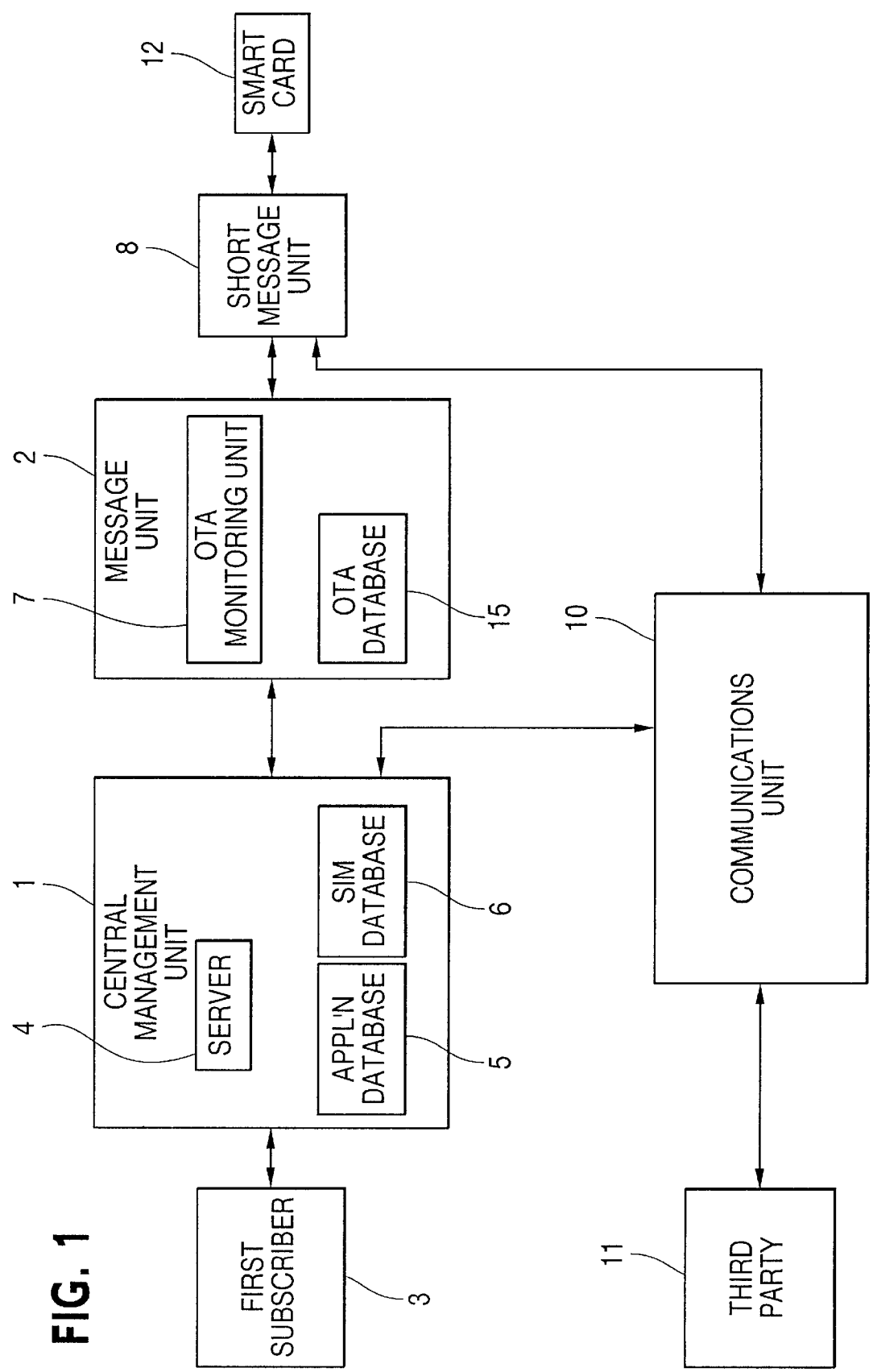
FIG. 1 shows a block diagram of an apparatus according to the invention.

In a communications network, data or information are transmitted from a first subscriber to a second subscriber or to a plurality of subscribers. The subscribers can read the data in or out by means of terminals. A smart card may be provided as the storage medium for the data.

The apparatus according to the invention enables transmission of data between the corresponding subscribers or enables a subscriber to obtain information about the state or about the application conditions of the smart card. The apparatus according to the invention has a central management unit 1 and a message unit 2 which control the flow of data between a first subscriber and, if appropriate, a second subscriber.

The central management unit 1 can be connected via an interface and a line to a first subscriber 3, which, as customer adviser, directs an inquiry to the central management unit 1 concerning the presence of the necessary storage capacity for specific applications on a smart card 12. A server 4 of the central management unit 1 accepts the inquiry and generates internally a request to an application database 5 and, if appropriate, to an SIM database 6. Application-specific data, such as, e.g., the name of the respective applications, the information about the assignment of these applications with regard to the type of smart card and/or the card manufacturer and the memory requirement of the respective applications, are stored in the application database 5. The SIM database 6 stores data for selecting subscribers for specific applications and has corresponding codings of short messages for the smart card. It contains card-specific data, such as, e.g., inter alia, features for card identification (IMSI, ICCID, MSISDN), data concerning the type of card, the card manufacturer and also keys and originating addresses for a short-message storage operation of predetermined applications.

The message unit 2 has an OTA monitoring unit 7, which monitors the execution of OTA operations and the transmission of short messages. By way of example, it receives packets of one or more formatted short messages with an indication of the destination address, the order of the short messages being defined. The OTA monitoring unit 7 can access an OTA database 15, in which there are stored a list of short messages and also a status field which combines the state information of the OTA operations involved.

The OTA monitoring unit 7 is connected to a short message unit 8, which forwards the short messages to a specific terminal or smart card 12, or vice versa. The short messages are transmitted in a wire-free manner (over the air, OTA).

A communications unit 10, which controls the flow of data between a third party 11 and the smart card 12, may additionally be provided. The latter is likewise connected to the short message unit 8. Furthermore, the communications unit 10 may also be connected to the central management unit 1, thereby providing access to the application database 5 and the SIM database 6. Consequently, third parties 11 can also access the data stored therein and/or change the data.

According to a first exemplary embodiment, the apparatus according to the invention enables the interrogation of the predetermined memory requirement for specific desired applications, for example programs for calling up up-to-date information such as football results, stock market data, etc. These can be interrogated upon inquiry by the subscriber 3 in the central management unit 1 and be communicated to the same. Standardized memory fields are involved in this case, with the result that the outlay on information to be stored relating to the memory requirement of the respective applications can be kept low.

According to a second exemplary embodiment, the inquiry by the subscriber 3 can be controlled in such a way that the memory reserve on the corresponding predetermined smart card 12 is checked directly via the message unit 2 and the short message unit 8. For this purpose, a memory identification signal of the operating system stored on the smart card 12 is interrogated, and this is then communicated back to the subscriber 3 via radio transmission (OTA) by means of the management unit 1. The subscriber 3 thereby obtains the desired information rapidly and reliably.

Figure 2:
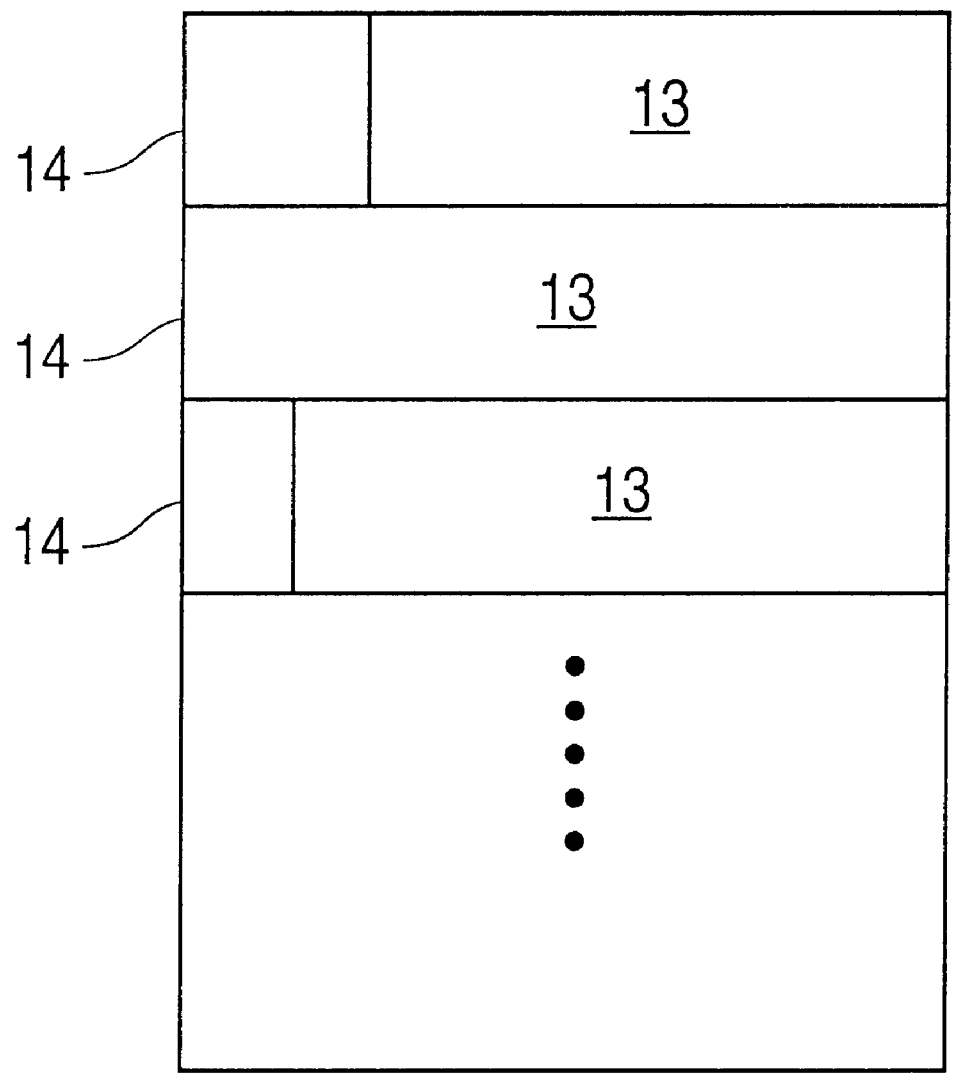
FIG. 2 shows a memory area on a smart card.

As can be seen in FIG. 2, the memory area of the smart card 12 is filled with a number of applications 13 each assigned to a predetermined memory field 14. The information about the size and number of the memory fields 14 may be stored on the smart card 12 and/or in the application database 5. The memory fields 14 are advantageously standardized in respect of their size, with the result that the volume of data to be processed can be limited or reduced. The volume of data of the respective applications 13 may differ. Optimal utilization of memory on the smart card 12 is ensured if the size of the memory fields 14 is constant and matched to the memory requirement of most of the applications 13 to be loaded onto the smart card 12. By way of example, it may be gathered from FIG. 2 that a second application 13 completely fills the memory field 14, while the other two applications 13 each occupy a portion of the memory field 14 which exceeds half of said memory field.

In this way, the invention enables the memory requirement needed on the smart card 12 to be determined rapidly do that the subscriber can issue the corresponding job for loading a predetermined application on the smart card 12.

What is claimed is:

1. An apparatus for the management of data for the operation of a communications network, the communications network having a multiplicity of terminals that are each assigned to a user by means of a smart card that communicates with the terminal, the apparatus comprising:

a message unit for transmitting and receiving short messages to and from the smart card; and a central management unit electrically communicating with the message unit and having a database that stores smart card-specific data and application-specific data relating to applications stored on the smart card such that the number of free memory fields available for an application on the smart card can be determined at any time.

2. The apparatus as claimed in claim 1, wherein the application-specific data are stored in such a way that present free memory space reserved on the smart card can be determined as a function of the predetermined number of applications originally stored on the smart card.

3. The apparatus as claimed in claim 1, wherein the message unit includes a short message unit for communicating with the smart card, and wherein a present free memory space reserve on the smart card can be determined by transmission and reception of a short message from the central management unit to the smart card and vice versa, the smart card having memory identification information present in an operating system of the smart card.

4. The apparatus as claimed in claim 1, wherein the database comprises a SIM database that stores the smart card-specific data and data specific to coding of the short message and also comprises another database that stores predetermined applications, wherein a predetermined application can be transmitted as a short message to the smart card for the purpose of storing the same on a free memory field.

* * * * *